United States Patent
Akasaka et al.

(10) Patent No.: US 9,837,788 B2
(45) Date of Patent: Dec. 5, 2017

(54) OPTICAL PHASE-SENSITIVE AMPLIFIER WITH RAMAN AMPLIFIER INTERMEDIATE STAGE

(71) Applicant: Fujitsu Limited, Kawasaki-shi, Kanagawa (JP)

(72) Inventors: Youichi Akasaka, Allen, TX (US); Motoyoshi Sekiya, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/958,160

(22) Filed: Dec. 3, 2015

(65) Prior Publication Data

US 2016/0261088 A1    Sep. 8, 2016

Related U.S. Application Data

(60) Provisional application No. 62/129,548, filed on Mar. 6, 2015.

(51) Int. Cl.

| | |
|---|---|
| G02B 26/08 | (2006.01) |
| H01S 3/30 | (2006.01) |
| G02F 1/31 | (2006.01) |
| H01S 3/067 | (2006.01) |
| H01S 3/131 | (2006.01) |
| H04B 10/291 | (2013.01) |

(52) U.S. Cl.
CPC ............. *H01S 3/302* (2013.01); *G02F 1/31* (2013.01); *H01S 3/06754* (2013.01); *H01S 3/1312* (2013.01); *H04B 10/2916* (2013.01); *H01S 2301/03* (2013.01); *H01S 2301/04* (2013.01)

(58) Field of Classification Search
CPC .................................................... H01S 3/302
USPC ........................................................ 359/298
See application file for complete search history.

(56) References Cited

U.S. PATENT DOCUMENTS 9,246,624 B1 *   1/2016   Yang ................. H04B 10/50

* cited by examiner

*Primary Examiner* — James Jones
(74) *Attorney, Agent, or Firm* — Baker Botts L.L.P.

(57) ABSTRACT

A method and system for amplifying optical signals includes generating idler signals for input signals using an optical pump at a first non-linear element (NLE). An intermediate stage including a Raman amplifier performs pump amplification using the output from the first NLE along a single optical path. Optical power monitoring of the input signals may be used for power equalization. The intermediate stage may include a wavelength selective switch for a certain degree of phase modulation. The phase-sensitive amplified signal is generated at a second NLE using the optical pump. Optical power monitoring of the input signals may be used for power equalization and other control functions to achieve low-noise operation.

20 Claims, 6 Drawing Sheets

400 — RAMAN AMPLIFIER GAIN MEDIUM PROFILE

Fig.1 Raman gain profiles of PDF and SMF

FIG. 4

500 — OPTICAL AMPLIFIER GAIN VERSUS RAMAN PUMP POWER

OPTICAL PHASE-SENSITIVE AMPLIFIER WITH RAMAN AMPLIFIER INTERMEDIATE STAGE

CROSS-REFERENCE TO RELATED APPLICATIONS

This application claims priority from U.S. Provisional Application No. 62/129,548 filed Mar. 6, 2015, entitled "OPTICAL PHASE-SENSITIVE AMPLIFIER WITH RAMAN AMPLIFIER INTERMEDIATE STAGE".

BACKGROUND

Field of the Disclosure

The present disclosure relates generally to optical communication networks and, more particularly, to optical phase-sensitive amplifiers with Raman amplifier intermediate stage.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM).

In PSK, the information carried by the optical signal may be conveyed by modulating the phase of a reference signal, also known as a carrier wave. The information may be conveyed by modulating the phase of the signal itself using differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or 0 and $\pi$) on the constellation diagram; or quadrature PSK (QPSK, 4-PSK, or 4-QAM) using four phases at 0°, 90°, 180°, and 270° (or 0, $\pi/2$, $\pi$, and 3 $\pi/2$). Phases in such signals may be offset. Each of 2-PSK and 4-PSK signals may be arranged on the constellation diagram.

M-PSK signals may further be polarized using techniques such as dual-polarization QPSK (DP-QPSK), wherein separate m-PSK signals are multiplexed by orthogonally polarizing the signals. M-QAM signals may also be polarized using techniques such as dual-polarization 16-QAM (DP-16-QAM), wherein separate m-QAM signals are multiplexed by orthogonally polarizing the signals.

Optical networks may also include various optical elements, such as amplifiers, dispersion compensators, multiplexer/demultiplexer filters, wavelength selective switches (WSS), optical switches, couplers, etc. to perform various operations within the network. In particular, optical networks may include costly optical-electrical-optical (O-E-O) regeneration at reconfigurable optical add-drop multiplexers (ROADMs) when the reach of an optical signal is limited in a single optical path.

As data rates for optical networks continue to increase, reaching up to 1 terabit/s (1T) and beyond, the demands on optical signal-to-noise ratios (OSNR) also increase, for example, due to the use of advanced modulation formats, such as QAM and PSK with dual polarization. In particular, noise accumulations resulting from cascading of optical amplifiers in an optical network operating at very high data rates may limit the reach of an optical signal at a desired level of OSNR and may result in an increased number of O-E-O regenerations, which is economically disadvantageous.

SUMMARY

In one aspect, a disclosed optical phase-sensitive amplifier includes an idler stage, an intermediate stage, and an amplification stage. The idler stage may be enabled to receive, as input, an optical signal and an optical pump, and to output the optical signal, the optical pump, and an idler signal corresponding to the optical signal. The intermediate stage including a Raman amplifier may be enabled to receive, as input from the idler stage, the optical signal, the optical pump, and the idler signal. Based on a Raman optical pump in the Raman amplifier, the intermediate stage may further be enabled to selectively amplify the optical pump and the idler signal. The amplification stage may be enabled to receive, as input from the intermediate stage, the optical signal, the amplified optical pump, and the amplified idler signal, and to amplify the optical signal.

In any of the disclosed embodiments of the optical phase-sensitive amplifier, the idler stage, the intermediate stage, and the amplification stage may include a single optical path over which the optical signal, the optical pump, and the idler signal propagate.

In any of the disclosed embodiments of the optical phase-sensitive amplifier, the intermediate stage enabled to selectively amplify the optical pump and the idler signal may further include the Raman amplifier enabled to amplify the idler signal to correspond in optical power to the optical signal.

In any of the disclosed embodiments of the optical phase-sensitive amplifier, the intermediate stage may further be enabled to modify an optical gain for amplifying the optical signal in the amplification stage by modifying an optical power of the Raman optical pump.

In any of the disclosed embodiments, the optical phase-sensitive amplifier may further include an optical power monitor to measure an optical signal-to-noise ratio (OSNR)

of the optical signal received by the optical phase-sensitive amplifier, while the intermediate stage may further be enabled to modify the optical power of the Raman optical pump based on the OSNR of the optical signal. In the optical phase-sensitive amplifier, the OSNR of the optical signal received by the optical phase-sensitive amplifier may be smaller than the OSNR of the optical signal after being amplified at the amplification stage.

In any of the disclosed embodiments of the optical phase-sensitive amplifier, the intermediate stage may further include a wavelength selective switch (WSS) to respectively modify at least one of a phase and an amplitude, for at least one of the optical signal, the optical pump, and the idler signal. In the optical phase-sensitive amplifier, the WSS may respectively modify the phase for at least one of the optical signal, the optical pump, and the idler signal to modify an optical gain for amplifying the optical signal in the amplification stage. In the optical phase-sensitive amplifier, the WSS may align the phase among the optical signal, the optical pump, and the idler signal.

In any of the disclosed embodiments of the optical phase-sensitive amplifier, the intermediate stage to selectively amplify the optical pump and the idler signal may include the Raman amplifier enabled to amplify the idler signal to exceed an optical power of the optical signal prior to the amplification stage.

In a further aspect, a disclosed method is for optical phase-sensitive amplification. The method may include, in an idler stage, receiving, as input, an optical signal and an optical pump, and outputting the optical signal, the optical pump, and an idler signal corresponding to the optical signal. The method may include, in an intermediate stage including a Raman amplifier, receiving, as input from the idler stage, the optical signal, the optical pump, and the idler signal. Based on a Raman optical pump in the Raman amplifier in the intermediate stage, the method may include selectively amplifying the optical pump and the idler signal. The method may further include, in an amplification stage, receiving, as input from the intermediate stage, the optical signal, the amplified optical pump, and the amplified idler signal, and amplifying the optical signal.

In any of the disclosed embodiments of the method, the idler stage, the intermediate stage, and the amplification stage may include a single optical path over which the optical signal, the optical pump, and the idler signal propagate.

In any of the disclosed embodiments of the method, selectively amplifying the optical pump and the idler signal in the intermediate stage may further include amplifying, by the Raman amplifier, the idler signal to correspond in optical power to the optical signal.

In any of the disclosed embodiments, the method may include modifying, in the intermediate stage, an optical power of the Raman optical pump to modify an optical gain for amplifying the optical signal in the amplification stage.

In any of the disclosed embodiments, the method may include measuring, using an optical power monitor, an optical signal-to-noise ratio (OSNR) of the optical signal received by the optical phase-sensitive amplifier, and modifying, in the intermediate stage, the optical power of the Raman optical pump based on the OSNR of the optical signal.

In any of the disclosed embodiments of the method, the OSNR of the optical signal received by the optical phase-sensitive amplifier may be smaller than the OSNR of the optical signal after being amplified at the amplification stage.

In any of the disclosed embodiments, the method may include, respectively modifying, at a wavelength selective switch (WSS) included in the intermediate stage, at least one of a phase and an amplitude, for at least one of the optical signal, the optical pump, and the idler signal.

In any of the disclosed embodiments of the method, the respectively modifying the phase may further include respectively modifying the phase for at least one of the optical signal, the optical pump, and the idler signal to modify an optical gain for amplifying the optical signal in the amplification stage. In any of the disclosed embodiments of the method, the respectively modifying the phase may further include aligning the phase among the optical signal, the optical pump, and the idler signal.

In any of the disclosed embodiments of the method, the selectively amplifying the optical pump and the idler signal may further include amplifying, at the Raman amplifier, the idler signal to exceed an optical power of the optical signal prior to the amplification stage.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Figure 1:
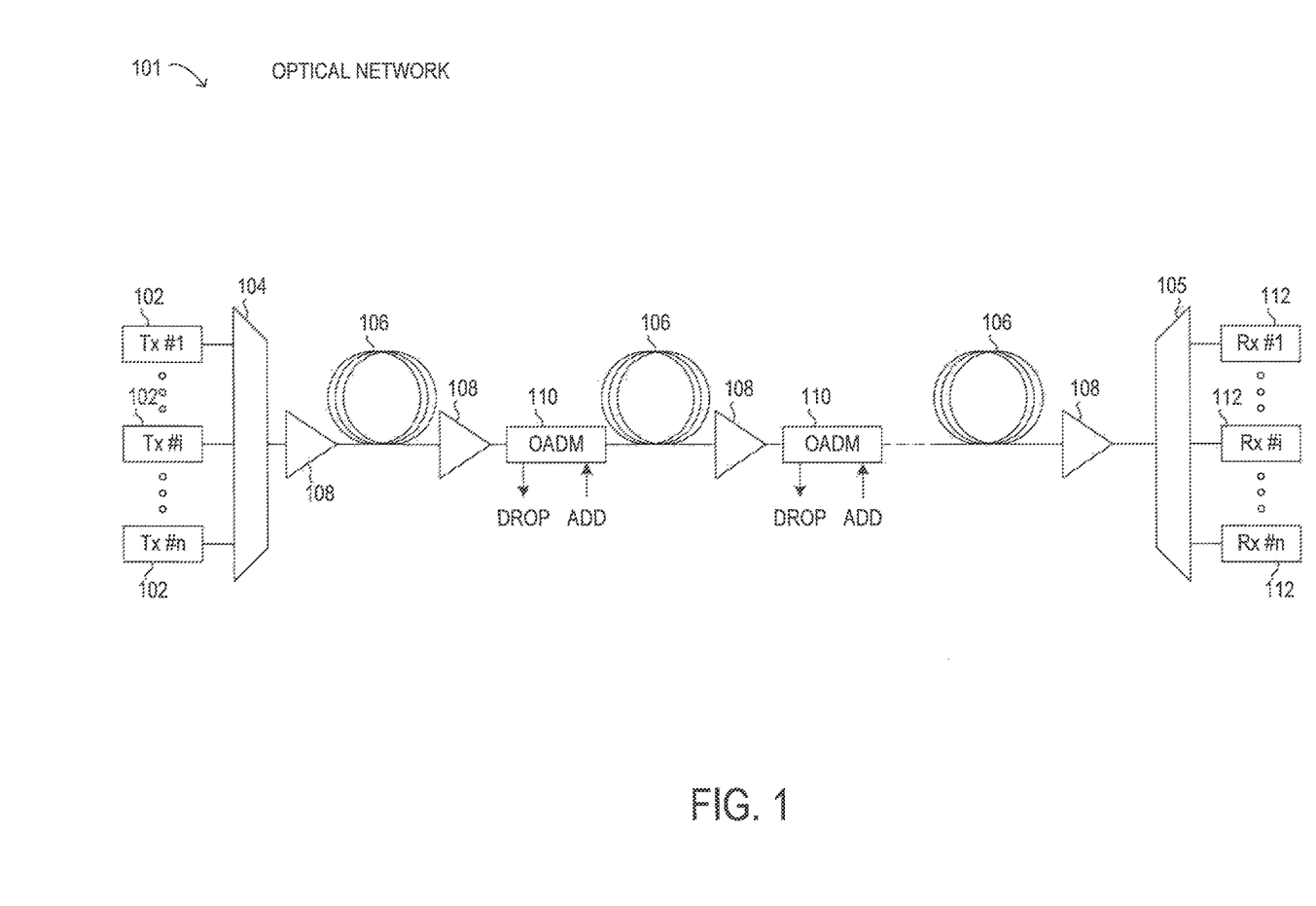
FIG. 1 is a block diagram of selected elements of an embodiment of an optical network.

Referring now to the drawings, FIG. 1 illustrates an example embodiment of optical network 101, which may represent an optical communication system. Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

Optical network 101 may include devices to transmit optical signals over optical fibers 106. Information may be transmitted and received through optical network 101 by modulation of one or more wavelengths of light to encode the information on the wavelength. In optical networking, a wavelength of light may also be referred to as a channel that is included in an optical signal (also referred to herein as a "wavelength channel"). Each channel may carry a certain amount of information through optical network 101.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels.

In FIG. 1, optical network 101 may also include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Additionally, polarization division multiplexing (PDM) technology may enable achieving a greater bit rate for information transmission. PDM transmission comprises independently modulating information onto different polarization components of an optical signal associated with a channel. In this manner, each polarization component may carry a separate signal simultaneously with other polarization components, thereby enabling the bit rate to be increased according to the number of individual polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical network 101.

In operation of optical network 101, as data rates approach 1 T and beyond, a correspondingly high OSNR becomes desirable to maintain economic feasibility by avoiding excessive numbers of O-E-O regenerators. One source of OSNR reduction is the noise accumulation resulting from cascaded optical amplifiers 108 at various points in the transmission path. For an optical amplifier, OSNR may be represented as a noise figure (NF), given by Equation 1, where $OSNR_{in}$ is the input OSNR, $OSNR_{out}$ is the output OSNR, and dB is decibels.

$$NF = 10\log(OSNR_{in}/OSNR_{out}) = OSNR_{in}\,[dB] - OSNR_{out}\,[dB] \quad \text{Equation (1)}$$

Current designs for optical amplifiers may include phase-sensitive optical amplifiers, which may exhibit a low noise figure, such as less than 3 dB in many instances. The lower noise figure may enable an increased optical reach for a given optical signal, which is desirable.

A typical phase-sensitive optical amplifier will have different stages, including an idler stage to initially generate an idler signal using an optical pump and an amplification stage to amplify the input signal using the optical pump and the idler signal. In between the idler stage and the amplification stage, an intermediate stage may be implemented in the phase-sensitive optical amplifier. The intermediate stage may involve complex signal processing and pump power recovery to adjust the power level of the input signal and the idler signal. In typical phase-sensitive optical amplifiers, the optical paths of the input signal, the optical pump, and the idler signal may be separated in the intermediate stage in order to independently modulate power of each of the signals. When the separated optical paths are recombined, a phase adjustment may be performed to re-align the phase of the signals. The phase adjustment may involve an optical phase lock loop to re-align the phases of the input signal and the idler signal with the optical pump.

As will be described in further detail, methods and systems are disclosed herein for implementing an optical phase-sensitive optical amplifier (PSA) with Raman amplifier intermediate stage that may avoid the relatively complex signal processing and potential operational instability resulting from the use of a phase lock loop, such as a feed-forward control loop for phase matching. As disclosed herein, the intermediate stage (also referred to as a regeneration stage) may include a Raman amplifier that does not split the optical paths of the input signal, the optical pump, and the idler signal. In this manner, the PSA with Raman amplifier intermediate stage disclosed herein may avoid having a phase lock loop for re-alignment of phases when the optical paths are split and then combined. The PSA with Raman amplifier disclosed herein may further be immune to environmental effects, such as temperature, vibration, etc., that may affect each separated optical path differently. The PSA with Raman amplifier intermediate stage disclosed herein may further monitor signal quality of WDM input channels. The PSA with Raman amplifier intermediate stage disclosed herein may still further provide sufficient optical bandwidth and flexible hardware to accommodate various changes in the number and configuration of the input optical channels. The PSA with Raman amplifier intermediate stage disclosed herein may also be used for broadband amplification of WDM input channels, such as optical signals in the C-band or the L-band.

Figure 2:
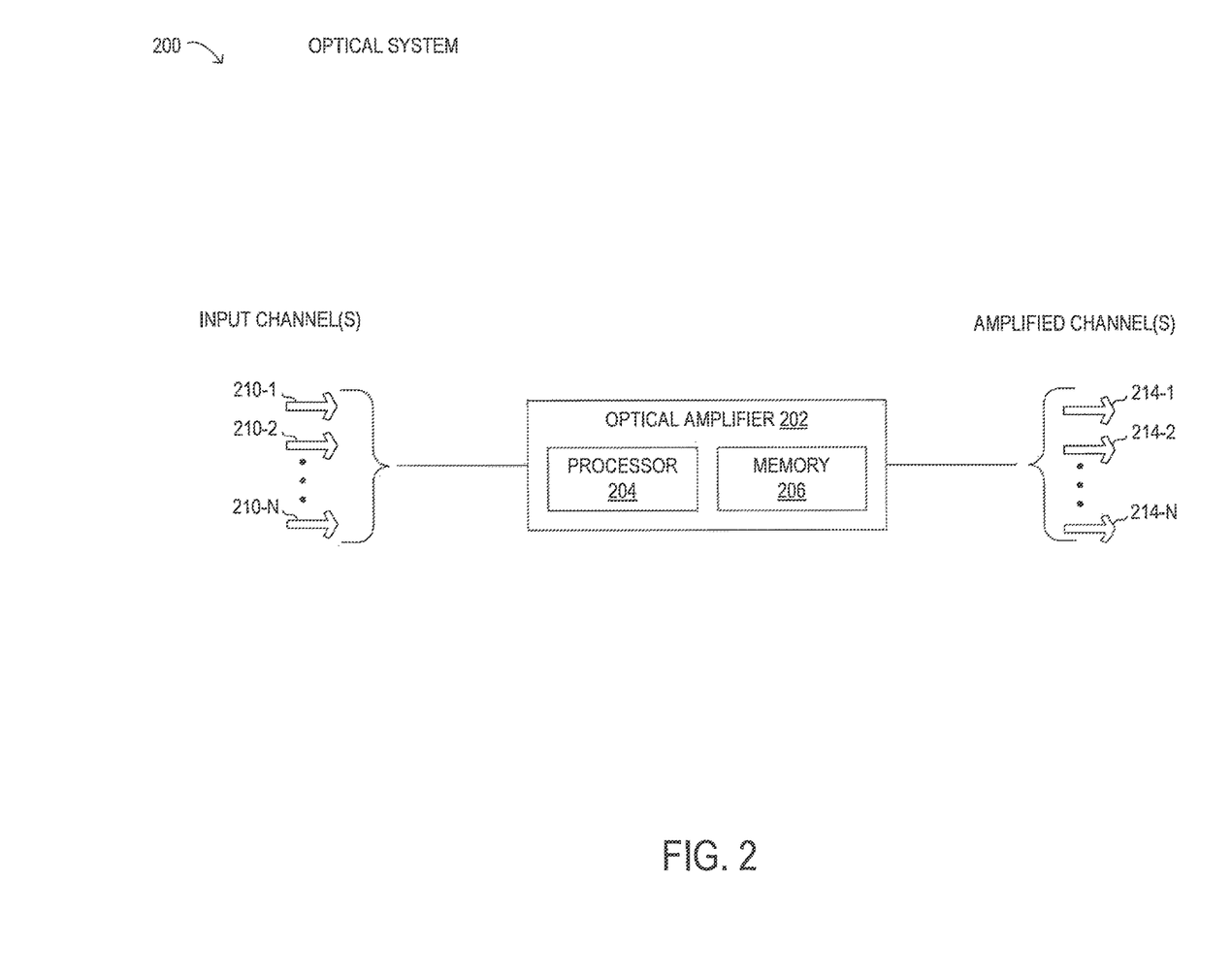
FIG. 2 is a block diagram of selected elements of an embodiment of a phase-sensitive optical amplifier with Raman amplifier intermediate stage.

Referring now to FIG. 2, selected elements of an example embodiment of optical system 200 to provide optical phase-sensitive amplification with Raman amplifier intermediate stage are depicted. As shown, optical system 200 includes optical amplifier 202, which may represent selected elements of an embodiment of amplifier 108 (see FIG. 1). One or more optical amplifiers, such as optical amplifier 202, may accordingly include a Raman amplifier in an intermediate stage. Optical amplifier 202 may further include a WSS, in some embodiments (see also FIG. 3).

Optical amplifier 202 may amplify optical signals in optical system 200. Optical system 200 may include input channels (i.e., optical signals) 210 to be amplified as output channels 214 by optical amplifier 202. Channels 210, 214 may be transmitted by optical system 200 over optical network 101 (see FIG. 1). Optical network 101 may include optical amplifier 202 in any suitable arrangement, such as in a transmission line between two optical components or in a ROADM. Furthermore, optical amplifier 202 may operate as a stand-alone device or as part of another piece of optical transmission equipment. As shown, input channels 210 comprise N number of channels, designated 210-1, 210-2, and so on, up to 210-N. Amplified channels 214 output by optical amplifier 202 correspondingly comprise N number of channels, designated 214-1, 214-2, and so on, up to 214-N. It is noted that N may have any value greater than or equal to 1. When N=1, input channels 210 may comprise a single channel, even though input channels 210 is used herein in the plural form.

Optical amplifier 202 may include any suitable number and kind of components to perform optical signal amplification, as described herein. Example implementations of all or part of optical amplifier 202 may include PSA with Raman amplifier intermediate stage 300, as described below for FIG. 3. Optical amplifier 202 may include a processor 204 coupled to a memory 206. In one embodiment, to perform optical signal amplification, optical amplifier 202 may include components to monitor, adjust, and pre-compensate input signals and other system characteristics, including an optical pump. In another embodiment, to perform optical signal amplification, optical amplifier 202 may include components for performing one-pump optical four-wave mixing (FWM). In a further embodiment, the FWM may be accomplished by passing the input signal, or filtered portions thereof, through a non-linear optical element (NLE), such as a doped optical fiber, periodically poled lithium niobate (PPLN), aluminum gallium arsenide (AlGaAs) or other semiconductor material that exhibits desired optical non-linearity.

Optical amplifier 202 may utilize two optical processing stages. In a first stage, optical amplifier 202 may generate an idler conjugate signal (also simply referred to as an "idler signal" or an "idler") of input channels 210. In a second stage, optical amplifier 202 may conduct phase-sensitive FWM. Such FWM may transfer the energy from an optical pump to the input channels 210 and to the idler signals.

Specifically, optical amplifier 202 may include means for generating a laser optical pump (also simply referred to as an "optical pump"), which may be used in an NLE idler stage to create idler signals in addition to the input signal. The idler signals may represent respective conjugate wavelengths to input channels 210. Optical amplifier 202 may then conduct FWM in an NLE amplification stage that amplifies input channels 210 based on the symmetric idler signals. The wavelengths of input channels 210 and idler signals may be spectrally equidistant (or nearly spectrally equidistant) from a wavelength of the optical pump. The spectrally equidistant or nearly spectrally equidistant wavelengths may include wavelengths that are, for example, perfectly spectrally equidistant or approximately spectrally equidistant such that overall performance may not be impacted significantly. Such approximately spectrally equidistant wavelengths may include wavelength differences between the idler signals and the optical pump that are approximately equal, or wavelength differences between the optical pump and input channels 210 that are approximately equal. In one embodiment, approximately equal wavelength differences may include wavelength differences that vary less than ten percent between the wavelength differences. Idler signals may exhibit a phase that is the inverse of the phase of input channels 210.

Input channels 210 may include an optical signal modulated through any suitable method, such as m-QAM or m-PSK. Input channels 210 may include dual-polarization components. Optical amplifier 202 may accept dual-polarization signals in any suitable manner.

Optical amplifier 202 may include optical performance monitoring (OPM), and a controller to dynamically control the operation of optical amplifier 202. Information regarding input channels 210, such as wavelength, power, residual chromatic dispersion, polarization mode dispersion, and OSNR may be monitored. Furthermore, information regarding the operation and output of the components of optical amplifier 202 may be monitored (see also FIG. 3).

Optical amplifier 202 may accept WDM signals. The first NLE idler stage of optical amplifier 202 may generate idler signals for each WDM component of input channels 210. Furthermore, the second NLE amplification stage of optical amplifier 202 may perform FWM for each pair of signals within input channels 210 and a respective idler signal counterpart generated from the first NLE idler stage. When WDM signals are used in optical amplifier 202, each idler signal may be equidistant (or nearly equidistant) in wavelength from the optical pump with respect to a wavelength of a corresponding input signal in input channels 210.

Processor 204 may comprise, for example a microprocessor, microcontroller, digital signal processor (DSP), application specific integrated circuit (ASIC), or any other digital or analog circuitry to interpret and execute program instructions and process data. In some embodiments, processor 204 may interpret and execute program instructions and process data stored in memory 206 to carry out some or all of the operation of optical amplifier 202. Memory 206 may be application memory, system memory, or both. Memory 206 may include any system, device, or apparatus to receive one or more memory modules. Each memory module may include any system, device or apparatus to retain program instructions and data for a period of time (e.g., computer-readable media). Memory 206 may be non-transitory. One or more portions or functionality of optical amplifier 202 may be implemented by the execution of instructions resident within memory 206 by processor 204.

Furthermore, optical amplifier 202 may include an intermediate stage between the first NLE idler stage and the second NLE amplification stage. The intermediate stage may include a Raman amplifier and a WSS, which may both transmit optical signals along a single optical path that includes the NLE idler stage and the NLE amplification stage. The Raman amplifier may utilize a narrow band gain medium that selectively amplifies the optical pump while the input signal and the optical pump propagate along the single optical path. In certain embodiments, the Raman amplifier may utilize a gain medium that can also amplify the idler signal. In some embodiments, the Raman amplifier may utilize a broadband gain medium that can amplify a number of optical channels over an optical band, such as the C-band or the S-band, along with an optical pump. The Raman amplifier includes a Raman optical pump, such as a laser source, that is directed through the gain medium in a counter propagation direction to the optical signal being processed. The Raman optical pump may be selected based on the gain medium used. For example, a 13 THz optical pump may be used with $GeO_2/SiO_2$ single mode fibers (SMF), while a 40 THz optical pump may be used with $P_2O_5$-doped $SiO_2$ phosphate-doped fiber (PDF) (see also FIG. 4). Furthermore, modulation or modification of the Raman pump power in the Raman amplifier may be used to determine or modify an optical gain of optical amplifier 202 (see also FIG. 5).

Because certain fiber non-linear effects may cause phase misalignment of the input signal and the optical pump during the NLE idler stage prior to the intermediate stage within optical amplifier 202, optical amplifier 202 may further include a WSS to perform a certain degree of phase and amplitude modulation on the optical signal, the idler signal and the optical pump. The WSS may perform phase alignment to optimize an optical gain in the amplification stage. Additionally, optical amplifier 202 may include an optical power monitor to measure OSNR of input channels 210. The optical power of the Raman optical pump may be modulated or modified based on the measured OSNR of input channels 210. In some embodiments, optical amplifier may increase the OSNR of amplified channels 214 with respect to input channels 210. In this manner, the intermediate stage of optical amplifier 202 may allow for a narrow gain bandwidth to amplify pump power without separation of the input signal and the optical pump along different optical paths, and without the use of a phase lock loop that may add complexity and may reduce operational reliability.

Figure 3:
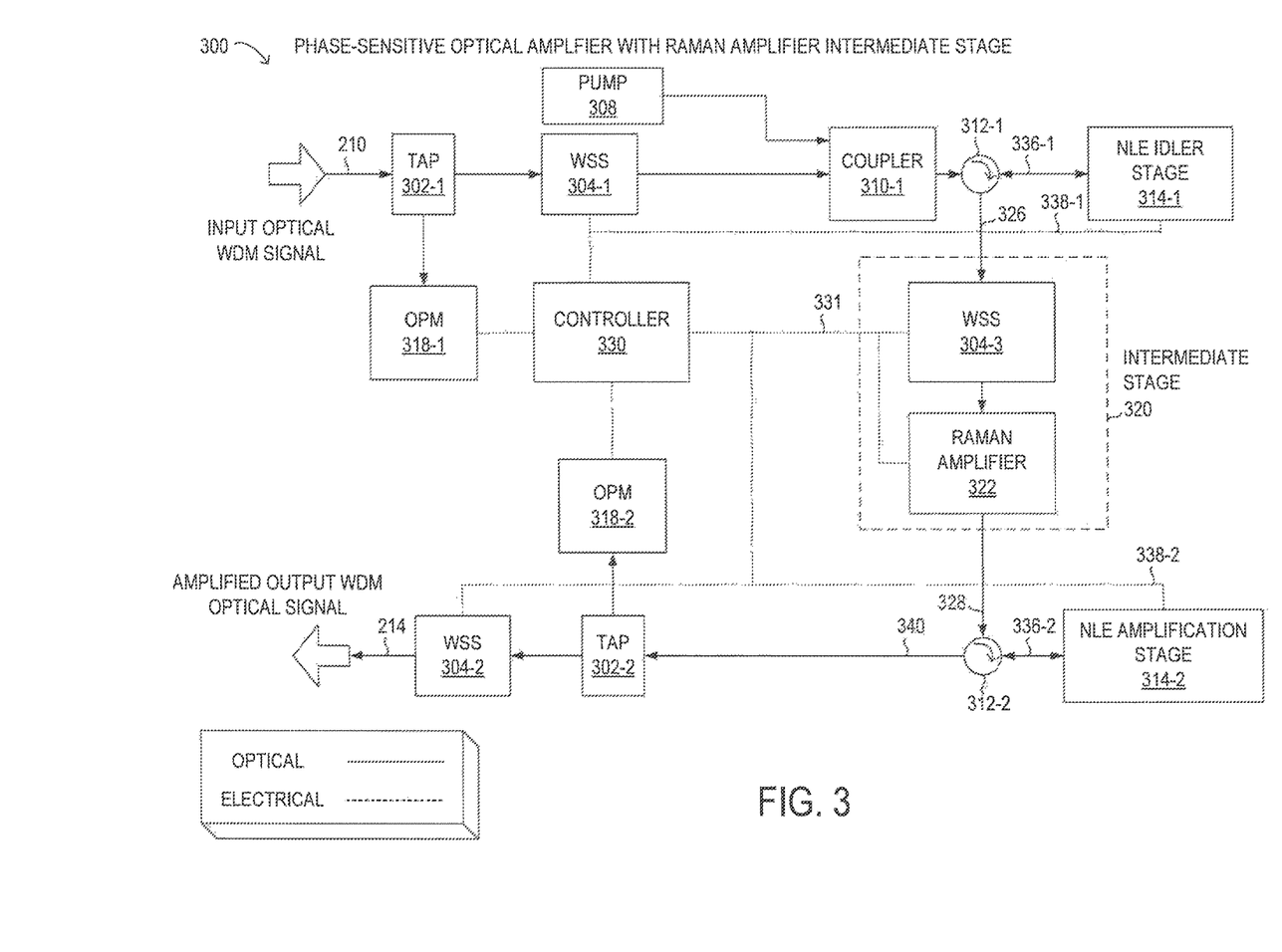
FIG. 3 is a block diagram of selected elements of an embodiment of a phase-sensitive optical amplifier with Raman amplifier intermediate stage.

Referring now to FIG. 3, selected elements of an embodiment of phase-sensitive optical amplifier with Raman intermediate phase 300 to provide low-noise optical phase-sensitive amplification are depicted. Optical amplifier 300 may be an embodiment of optical amplifier 202 in FIG. 2. In FIG. 3, optical amplifier 300 is shown in a schematic representation and is not drawn to scale. It is noted that, in different embodiments, optical amplifier 300 may be operated with additional or fewer elements.

In FIG. 3, optical amplifier 300 is described with respect to input optical WDM signals represented by N number of input channels 210 (see FIG. 2). Although fixed grid WDM input channels 210 are shown herein for descriptive purposes, it is noted that other spectral channel arrangements, such as flex-grid channel spacing, may be practiced in particular embodiments. Also in FIG. 3, solid lines represent optical paths, while dashed lines represent electrical connections.

As shown in FIG. 3, optical amplifier 300 may be used in optical network 101 along a single optical path from transmitter 102 to receiver 112. The use of phase-insensitive optical amplifiers, such as EDFA-based optical amplifiers, may degrade the noise performance of optical amplifier 300, which is phase-sensitive. Therefore, in particular embodiments, optical amplifier 300 may be used in optical paths that do not include a phase-insensitive optical amplifier prior to optical amplifier 300 in the optical path.

In FIG. 3, input channels 210 are provided for optical amplification in the propagation direction shown. Optical amplifier 300 may include a mechanism for accepting an input signal such as input channels 210. Input channels 210 may include a plurality of WDM channels, each of which may correspond to a different wavelength. Furthermore, each such channel may correspond to a different modulation format. In some embodiments, for each channel, input channels 210 may include an X-polarization and a Y-polarization component.

At tap 302-1, input channels 210 may be split and directed to WSS 304-1, which may be used to select a desired group of channels among input channels 210, and OPM 318. For example, depending on an optical bandwidth supported by optical amplifier 300, a number of channels in input channels 210 may be limited for processing at WSS 304-1. In other embodiments, WSS 304-1 may pass all input channels 210 for processing. Thus, WSS 304-1 may select the desired channels of input channels 210 to be processed, for example, on a per-wavelength basis. WSS 304-1 may be implemented in any suitable manner, such as by active or passive configurable filters, array waveguides, electromechanical devices, or crystals. As shown, WSS 304-1 is communicatively coupled to controller 330 for control and monitoring purposes using an electrical connection. Controller 330 may adjust the operation of WSS 304-1 to, for example, select what portion of input channels 210 are to be amplified by optical amplifier 300.

As shown, optical amplifier 300 includes optical performance monitoring (OPM) 318-1, which receives input channels 210 and is communicatively coupled to controller 330 for control and monitoring purposes using an electrical connection. OPM 318-1 may monitor information regarding input channels 210, such as wavelength, power, residual chromatic dispersion, polarization mode dispersion, and OSNR. Controller 330 may receive monitoring information from OPM 318-1 and may adjust various other components accordingly.

WSS 304-1 may send optical signals to coupler 310-1, which also receives optical pump 308. In various embodiments, optical pump 308 may include a tunable optical source, such as a tunable laser. Optical pump 308 may be communicatively coupled to controller 330. Controller 330 may adjust the wavelength, power, phase, or other aspects of the operation of optical pump 308, among other optical signals, based upon, for example, the nature or kind of input channels 210, detected output of optical pump 308, or detected output of optical amplifier 300. In certain instances, optical pump 308 may include stimulated Brillouin scattering (SBS) suppression to compensate for density variations that may cause undesired scattering in an NLE. Furthermore, optical pump 308 may be polarized with respect to each of the dual-polarizations in input channels 210, when present.

Coupler 310-1 may combine input channels 210 with the optical pump generated by pump 308 and provide the combined output to optical circulator 312-1. Optical circulator 312-1 may include any suitable mechanism for selective routing of inputs and outputs according to the present disclosure. For example, optical circulator 312-1 may include a plurality of sequentially identified optical input-output ports and may allow light to travel in only one direction. An optical signal entered into a first port will exit the second port, while a signal entering the second port will exit the third port. The sequential identification of the first, second, and third port, and thus the input-output behavior, may be schematically identified with a clockwise or counterclockwise indicator. In the example of FIG. 3, optical circulator 312-1 operates in clockwise fashion such that the input from coupler 310-1 is output via optical link 336-1 to NLE idler stage 314-1, and input from NLE idler stage 314-1 is output to regulation stage 310-1 via optical link 326.

At NLE idler stage 314-1, idler signals symmetric in wavelength about optical pump 308 to input channels 210 are added. Based on what is selected by WSS 304-1 for input to optical amplifier 300, NLE idler stage 314-1 may add corresponding idler signals, as instructed by controller 330 via control link 338-1. NLE idler stage 314-1 may operate in a polarization insensitive manner by separating each polarization component and sending each polarization component in a different propagation direction through a NLE. At the output of NLE idler stage 314-1, the amplitude of input channels 210 and idler signals will not yet be amplified, and may be relatively weak in amplitude, corresponding to an input level of optical amplifier 300. It is noted that some undesirable differences in amplitude between input channels 210 and idler signals may be present at the output of NLE idler stage 314-1. Also, optical pump 308 may be adulterated to a degree due to optical wavelength interaction or mixing between input channels 210 wavelengths and idler signal wavelengths when emerging from NLE idler stage 314-1.

In FIG. 3, optical link 326 sends the combined input channels 210, optical pump, and idler signals to intermediate stage 320. As shown, intermediate stage 320 comprises a Raman amplifier 322 and WSS 304-3. Raman amplifier 322 may include a gain medium, such as single mode fiber and a Raman optical pump. The Raman optical pump (not shown) may provide optical energy to Raman amplifier 322 in a reverse direction to the propagation direction of optical link 326. At the output of intermediate stage, optical link 328 may include input channels 210 with the amplified optical pump and the idler signal(s) as generated by Raman amplifier 322. In various embodiments, the optical power of the idler signals may be equalized to the optical power of input channels 210 by Raman amplifier 322. In some instances, the optical power of the idler signals may be amplified to be greater than the optical power of input channels 210 by Raman amplifier 322, which may improve overall OSNR of amplified optical signal 214 generated by optical amplifier 300. Controller 330 may adjust the wavelength, power, phase, or other aspects of the operation of optical signals and idler signals based upon, for example, the nature or kind of input channels 210, or detected output of optical amplifier 300.

As shown, WSS 304-3 may perform minor phase modulation within intermediate stage 320 to align the phases of input channels 210, the optical pump, and the idler signals in optical link 328. The phases may be modified by WSS 304-3 to modify, or optimize, an optical gain for amplifying the optical signal in the amplification stage. For example, a phase alignment among any one or more of the input channels 210 (the optical signal), the idler signals, and the optical pump may be performed using WSS 304-3. In some embodiments, a gain difference between different optical channels in input channels 210 may be equalized by selecting a different phase for each individual channel.

It is noted that Raman amplifier 322 may be operated without a feed-back or feed-forward control loop. For example, Raman amplifier 322 may be adjusted initially for a given operational configuration, and may then operate in a stable manner. In certain embodiments, Raman amplifier 322 may be manually tuned. Because intermediate stage does not involve any separation of optical paths, effects from temperature, vibration, etc. that may affect phase-mismatch along separate optical paths may be safely ignored in optical amplifier 300, which may improve stability and robustness, while reducing overall complexity of PSA amplifier 300.

In some embodiments, intermediate stage 320 may amplify optical pump 308 separately from the idler signals, such as when a P-doped Raman amplifier is used. The idler signals may be amplified separately using a narrow band amplifier, such as a fiber Brillouin amplifier. In particular instances, only optical pump 308 is amplified during intermediate stage 320, while a power level of input channels 210 is attenuated to equalize with the idler signals.

In FIG. 3, intermediate stage 320 outputs optical link 328 to circulator 312-2, which outputs the received optical signal to NLE amplification stage 314-2 at optical link 336-2. Circulator 312-2 receives the amplified optical signal from NLE amplification stage 314-2 via optical link 336-2 and outputs the amplified optical signal to optical link 340. At tap 302-2, optical link 340 provides the amplified optical signal to OPM 318-2, which communicates with controller 330 to provide an indication of output power levels of optical amplifier 300. Tap 302-2 also outputs the amplified optical signal to WSS 304-2, which may select wavelengths corresponding to input channels 210 for output and may block out other undesired wavelengths, such as the optical pump and the idler signals to generate output signals 214.

Additionally, optical amplifier 300 may exhibit a dependency on input OSNR, which may be monitored by OPM 318-1. In order to obtain a certain desired optical gain in NLE amplification stage 314-2, the optical power of optical pump 308 or the Raman optical pump or both may be varied depending on the input OSNR. It is noted that in some embodiments, optical amplifier 300 may operate with no or very little optical gain but yet provide an increase in OSNR of amplified optical signal 214 as compared to input optical signal 210. In such an arrangement, optical amplifier 300 may replace an O-E-O regenerator to increase reach of an optical signal by improving OSNR.

Figure 4:
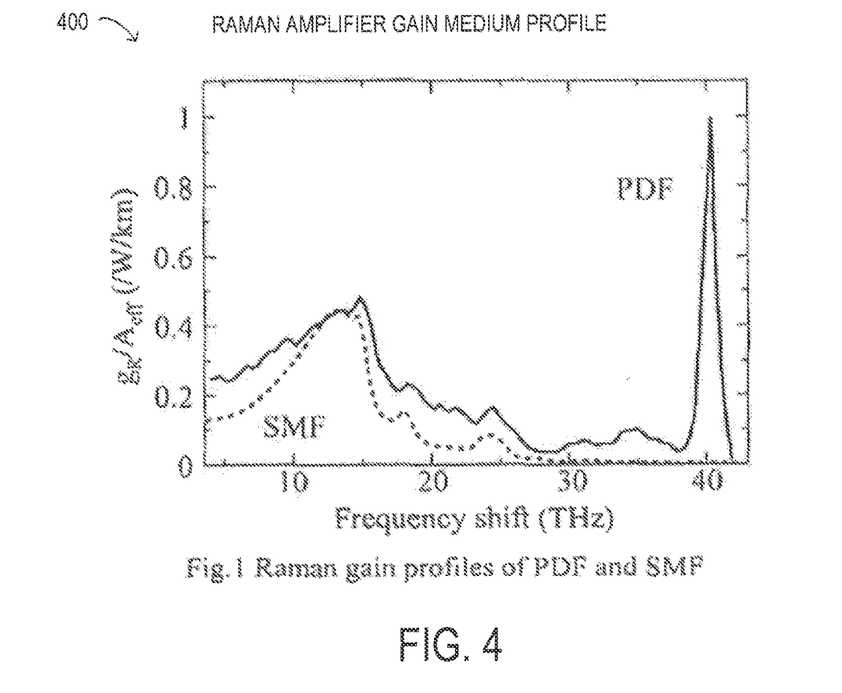
FIG. 4 is a plot of Raman amplifier gain medium profiles.

Referring now to FIG. 4, a plot 400 showing gain medium profiles for gain media usable with Raman amplifier 322 in intermediate stage 320 of FIG. 3 is depicted. Gain profiles for SMF and PDF type fibers are shown. The Raman frequency shift is given by Equation 2 below.

$$\overline{v} = \frac{1}{\lambda_i} - \frac{1}{\lambda_s} \qquad \text{Equation (2)}$$

In Equation 2, $\overline{v}$ is the frequency shift, $\lambda_i$ is the initial wavelength and $\lambda_s$ is the shifted wavelength. Gain peaks at about 13 THz frequency shift for both SMF and PDF in FIG. 4 show one potential Raman pump frequency for Raman amplifier 322. The asymmetric gain profile may be used to selectively amplify the optical pump and the idler signal in intermediate stage 320. In some embodiments, the gain peak at 13 THz frequency shift may be used for broadband amplification (see also FIG. 6). A very narrow bandwidth gain corresponding to about 5-6 nm of wavelength is also available using PDF at 40 THz Raman pump frequency to amplify the optical pump.

Figure 5:
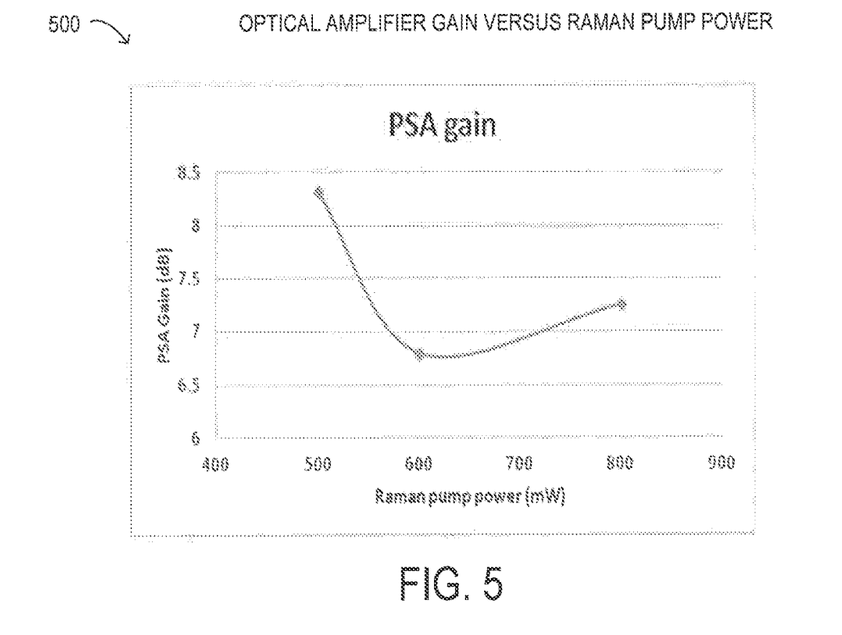
FIG. 5 is a plot of gain versus Raman pump power for a phase-sensitive optical amplifier with Raman amplifier intermediate stage.

Referring now to FIG. 5, a plot showing optical amplifier gain versus Raman pump power is depicted. FIG. 5 is applicable to optical amplifier 300 in FIG. 3 and specifically to Raman amplifier 322. As shown in FIG. 5, the change in PSA gain with varying Raman pump power shows that Raman amplifier 322 can implement phase control of the optical pump of optical amplifier 300. The change in PSA gain may be a result of phase shift of the optical pump of optical amplifier 300, which may be caused by varying the Raman pump power.

Figure 6:
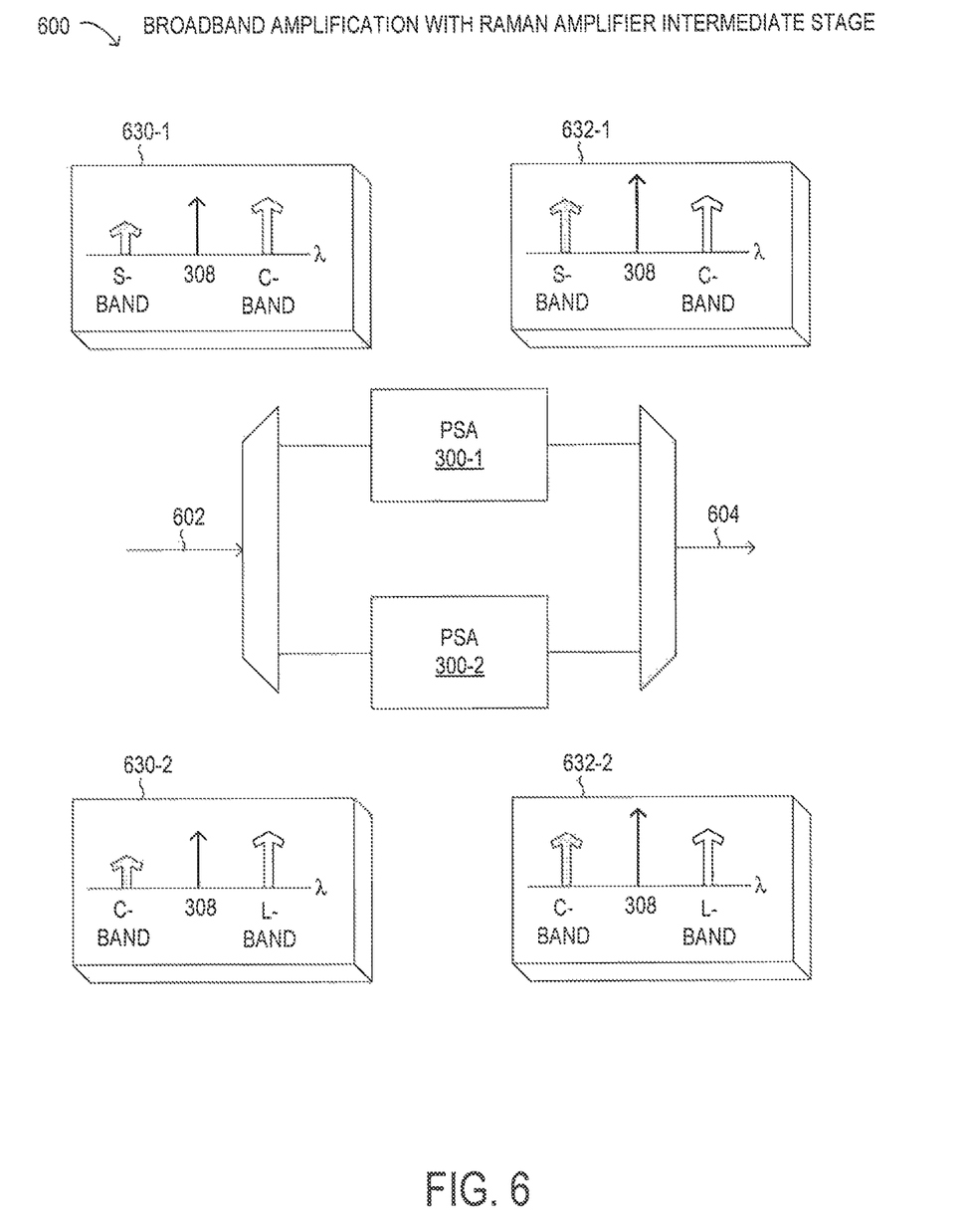
FIG. 6 is a block diagram of selected elements of an embodiment of broadband amplification using a phase-sensitive optical amplifier with Raman amplifier intermediate stage.

Referring now to FIG. 6, a block diagram of selected elements of an embodiment of broadband amplification 600 using a phase-sensitive optical amplifier with Raman amplifier intermediate stage is shown. As shown, broadband amplification 600 may be performed using PSA 300 as described above with respect to FIG. 3. By selecting a desired Raman gain profile for the medium used, a relatively flat gain profile may be achieved for broadband amplification 600.

In broadband amplification 600, input optical signals may include C-band signals and L-band signals in various combinations or arrangements. The C-band signals may be separated and directed to PSA 300-1 for amplification, while the L-band signals may be directed to PSA 300-2 for amplification. Then, the amplified C-band and L-band signals may be recombined into output optical signal 604.

At PSA 300-1, which acts as an S-band optical amplifier, idler signals in the S-band may be generated in NLE idler stage 314-1, as shown in spectrum 630-1. In this case, optical pump 308 may be generated at around 1530 nm wavelength. Then, a broadband Raman gain profile may be used with a Raman optical pump at about 1425 nm to selectively amplify the S-band idler signals and optical pump 308, as shown in spectrum 632-1.

At PSA 300-2, which acts as a C-band optical amplifier, idler signals in the C-band may be generated in NLE idler stage 314-1, as shown in spectrum 630-2. In this case, optical pump 308 may be generated at around 1560 nm wavelength. Then, a broadband Raman gain profile may be used with a Raman optical pump at about 1455 nm to selectively amplify the C-band idler signals and optical pump 308, as shown in spectrum 632-2.

In broadband amplification 600, a certain level of optical power for optical pump 308 may be introduced into Raman amplifier 322 to effect a phase-sensitive modulation of the optical power. In some embodiments, the optical power of optical pump 308 may be at least 10 dBm.

Figure 7:
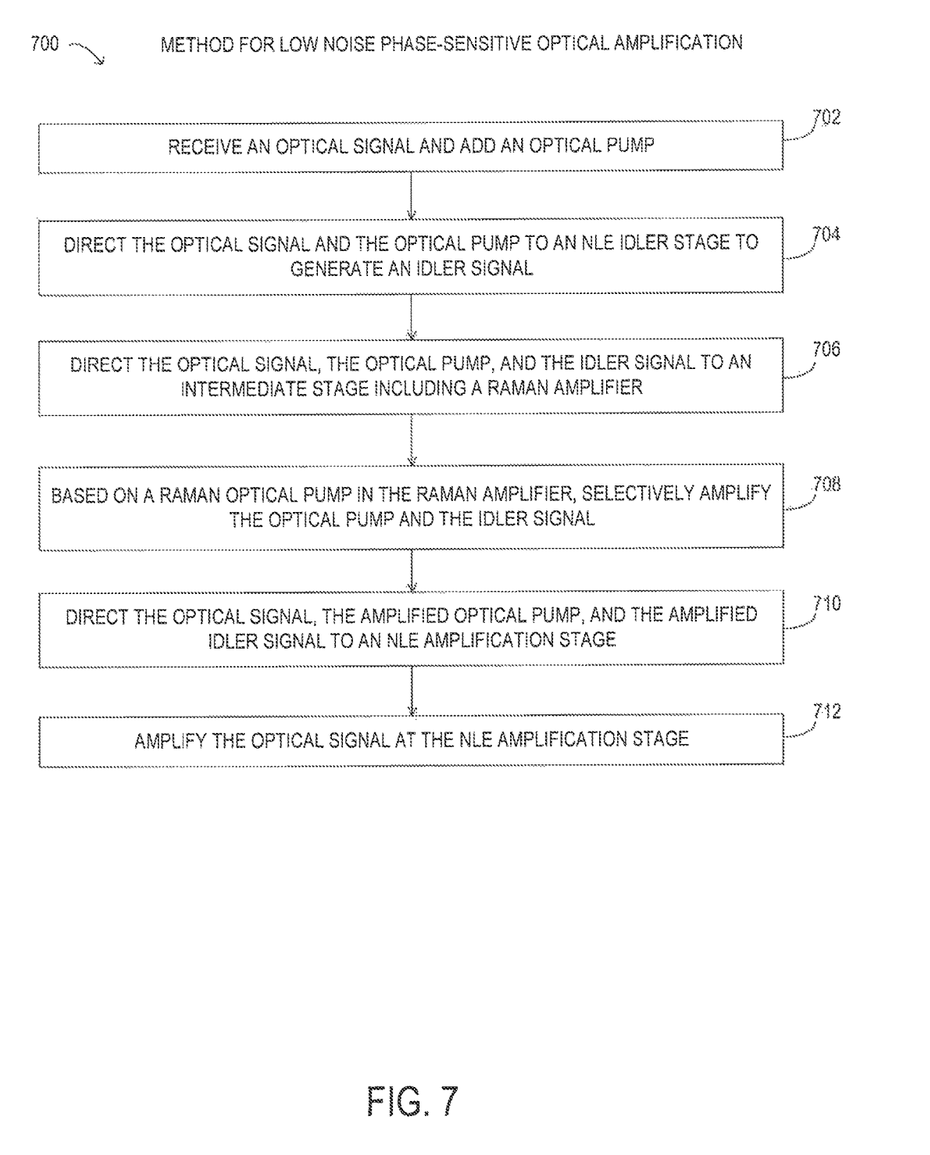
FIG. 7 is a flow chart of selected elements of a method for optical phase-sensitive amplification using a phase-sensitive optical amplifier with Raman amplifier intermediate stage.

Referring now to FIG. 7, a block diagram of selected elements of an embodiment of method 700 a method for optical phase-sensitive amplification using a phase-sensitive optical amplifier with Raman amplifier intermediate stage, as described herein, is depicted in flowchart form. Method 700 may be performed using optical amplifier 300. It is noted that certain operations described in method 700 may be optional or may be rearranged in different embodiments.

Method 700 may begin at step 702 by receiving an input optical signal and adding an optical pump. At step 704, the optical signal and the optical pump may be directed to an NLE idler stage to generate an idler signal. At step 706, the optical signal, the optical pump, and the idler signal may be directed to an intermediate stage including a Raman amplifier. At step 708, based on a Raman optical pump in the Raman amplifier, the optical pump and the idler signal may be selectively amplified. At step 710, the optical signal, the amplified optical pump, and the amplified idler signal may be directed to an NLE amplification stage. At step 712, the optical signal may be amplified at the NLE amplification stage.

As disclosed herein, methods and systems for amplifying optical signals include generating idler signals for input signals using an optical pump at a first non-linear element (NLE). An intermediate stage including a Raman amplifier performs pump amplification using the output from the first NLE along a single optical path. Optical power monitoring of the input signals may be used for power equalization. The intermediate stage may include a wavelength selective switch for a certain degree of phase modulation. The phase-sensitive amplified signal is generated at a second NLE using the optical pump. Optical power monitoring of the input signals may be used for power equalization and other control functions to achieve low-noise operation.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An optical phase-sensitive amplifier, comprising:
   an idler stage enabled to:
      receive, as input, an optical signal and an optical pump light; and
      output the optical signal, the optical pump light, and an idler signal corresponding to the optical signal;
   an intermediate stage including a Raman amplifier enabled to:
      receive, as input from the idler stage, the optical signal, the optical pump light, and the idler signal;
      based on a Raman optical pump in the Raman amplifier, selectively amplify the optical pump light and the idler signal; and
   an amplification stage enabled to:
      receive, as input from the intermediate stage, the optical signal, the amplified optical pump light, and the amplified idler signal; and
      amplify the optical signal.

2. The optical phase-sensitive amplifier of claim 1, wherein the idler stage, the intermediate stage, and the amplification stage comprise a single optical path over which the optical signal, the optical pump light, and the idler signal propagate.

3. The optical phase-sensitive amplifier of claim 1, wherein the intermediate stage enabled to selectively amplify the optical pump light and the idler signal further comprises the Raman amplifier enabled to:
   amplify the idler signal to correspond in optical power to the optical signal.

4. The optical phase-sensitive amplifier of claim 1, wherein the intermediate stage is further enabled to:
   modify an optical gain for amplifying the optical signal in the amplification stage by modifying an optical power of the Raman optical pump.

5. The optical phase-sensitive amplifier of claim 1, further comprising:
   an optical power monitor to measure an optical signal-to-noise ratio (OSNR) of the optical signal received by the optical phase-sensitive amplifier; and
   wherein the intermediate stage is further enabled to modify the optical power of the Raman optical pump based on the OSNR of the optical signal.

6. The optical phase-sensitive amplifier of claim 5, wherein the OSNR of the optical signal received by the optical phase-sensitive amplifier is smaller than the OSNR of the optical signal after being amplified at the amplification stage.

7. The optical phase-sensitive amplifier of claim 1, wherein the intermediate stage further comprises:
   a wavelength selective switch (WSS) to respectively modify at least one of a phase and an amplitude, for at least one of the optical signal, the optical pump light, and the idler signal.

8. The optical phase-sensitive amplifier of claim 7, wherein the WSS respectively modifies the phase for at least one of the optical signal, the optical pump light, and the idler signal to modify an optical gain for amplifying the optical signal in the amplification stage.

9. The optical phase-sensitive amplifier of claim 7, wherein the WSS aligns the phase among the optical signal, the optical pump light, and the idler signal.

10. The optical phase-sensitive amplifier of claim 1, wherein the intermediate stage enabled to selectively amplify the optical pump light and the idler signal further comprises the Raman amplifier enabled to:
   amplify the idler signal to exceed an optical power of the optical signal prior to the amplification stage.

11. A method for optical phase-sensitive amplification, the method comprising:
   in an idler stage:
      receiving, as input, an optical signal and an optical pump light; and
      outputting the optical signal, the optical pump light, and an idler signal corresponding to the optical signal;
   in an intermediate stage including a Raman amplifier:
      receiving, as input from the idler stage, the optical signal, the optical pump light, and the idler signal;
      based on a Raman optical pump in the Raman amplifier, selectively amplifying the optical pump light and the idler signal; and
   in an amplification stage:
      receiving, as input from the intermediate stage, the optical signal, the amplified optical pump light, and the amplified idler signal; and
      amplifying the optical signal.

12. The method of claim 11, wherein the idler stage, the intermediate stage, and the amplification stage comprise a single optical path over which the optical signal, the optical pump light, and the idler signal propagate.

13. The method of claim 11, wherein selectively amplifying the optical pump light and the idler signal in the intermediate stage further comprises:
   amplifying, by the Raman amplifier, the idler signal to correspond in optical power to the optical signal.

14. The method of claim 11, further comprising:
   modifying, in the intermediate stage, an optical power of the Raman optical pump to modify an optical gain for amplifying the optical signal in the amplification stage.

15. The method of claim 11, further comprising:
   measuring, using an optical power monitor, an optical signal-to-noise ratio (OSNR) of the optical signal received by the optical phase-sensitive amplifier; and
   modifying, in the intermediate stage, the optical power of the Raman optical pump based on the OSNR of the optical signal.

16. The method of claim 11, wherein the OSNR of the optical signal received by the optical phase-sensitive amplifier is smaller than the OSNR of the optical signal after being amplified at the amplification stage.

17. The method of claim 11, further comprising:
   respectively modifying, at a wavelength selective switch (WSS) included in the intermediate stage, at least one of a phase and an amplitude, for at least one of the optical signal, the optical pump light, and the idler signal.

18. The method of claim 17, wherein the respectively modifying the phase further comprises:
   respectively modifying the phase for at least one of the optical signal, the optical pump light, and the idler signal to modify an optical gain for amplifying the optical signal in the amplification stage.

19. The method of claim 17, wherein the respectively modifying the phase further comprises:
   aligning the phase among the optical signal, the optical pump light, and the idler signal.

20. The method of claim 11, wherein the selectively amplifying the optical pump light and the idler signal further comprises:
   amplifying, at the Raman amplifier, the idler signal to exceed an optical power of the optical signal prior to the amplification stage.

* * * * *